United States Patent
Shoolery et al.

Patent Number: 5,570,283
Date of Patent: Oct. 29, 1996

[54] CORPORATE TRAVEL CONTROLLER

[75] Inventors: John R. Shoolery, Palo Alto; Guy E. Pasela, Davis; Diane L. De La Torre, San Bruno; Kenneth M. Leung, San Jose; Kathleen A. Morris, Saratoga, all of Calif.

[73] Assignee: TravelNet, Inc., Santa Clara, Calif.

[21] Appl. No.: 342,348

[22] Filed: Nov. 18, 1994

[51] Int. Cl.$^6$ .................................................. G06F 153/02
[52] U.S. Cl. ....................................... 364/407; 364/401 R
[58] Field of Search ................................. 364/401–402, 364/403, 406, 408; 340/825.28; 395/200, 650, 275, 500, 600, 800, 916, 934; 379/90, 355, 356; 370/80.5, 80.6

[56] References Cited

U.S. PATENT DOCUMENTS 5,237,499  8/1993  Garback .................................. 364/407

OTHER PUBLICATIONS

"Covia Adds Customization Tools Access Co.", Business Travel News, May 7, 1997 p. 12. Dialog File 16, Acc. No. 725978 2.

"Sun Will Shine Thru Windows, (Sun Microsystems: Automates business travel management process", Business Travel News Jul. 6, 1992 p. A4, Dialog file 16, Acc No. 73932882.

Belitsos, Byron, "MIS pilots the air wars (includes related article on Covia Corp's distributed Apollo reservations system)" Computer & Communications Decisions, V27, N3, p. 36(6); Mar. 1988, Dialog Acc. No. 73573165.

"Netwise RPC Tool: Distributed Applications with Less Pain Netwise: Lanuches RPC distributing application tool" Network computing Maruch, 1991 p. 16.

"Playing by the Rules: How Zenith Travel is using the new CRS regulations to develop better automation" Travel Agent, Jun. 28, 1993, p. 87, Dialog File 16 Acc. No. 04523256.

"Going Mobile: SABRE's LANLink offers home agents complete flexibility to use office LAN programs" Travel Agent Mar. 7, 1994, p. 60, Dialog File 16 Acc. No. 04971977.

"Working Knowledge: Technology will dictate the continuing evolution of the role of agents and stimulate travel by informed consumers", Travel Agent, Mar. 21, 1994, p. 34; Dialog File 16 Acc. No. 05005272.

"Reservation Legacy (Unix-based reservations systems are discussed)", UNIX News, Jun. 1994, p. 17 Dialog File 16, Acc. No. 05141282.

"Upgrading the System", Travel Agent, Jan. 10, 1994, p. 50. Dialog, File 16, Acc. No. 04883418.

*Primary Examiner*—Donald E. McElheny, Jr.
*Assistant Examiner*—Frantzy Poinvil
*Attorney, Agent, or Firm*—Pillsbury Madison & Sutro LLP

[57] ABSTRACT

A system for controlling travel primarily in a corporate environment that interconnects travelers, travel agents and airline CRSs so that a traveler can communicate with the CRS with a user friendly GUI to obtain schedule information and transfer such to a travel agent, the travel agent can use the selected schedule information for ticketing and to assure the lowest cost while the entire trip information is stored locally for management control. The system includes multiple connects to the CRS to overcome data transfer limitations specific to airline CRSs.

27 Claims, 4 Drawing Sheets

CORPORATE TRAVEL CONTROLLER

BACKGROUND OF THE INVENTION

Corporate travel and the costs attendant thereto is one of the few large cost items in a corporate environment that can be reduced without adversely affecting the business. Using data on where, how and when to travel and integrated monitoring control over employees travel corporate travel expenses can be reduced up to 20% without draconian rules or loss of business efficiency.

The primary components of corporate travel expense are air travel, hotels and car rentals. Reservations are typically booked through global computerized reservation systems (CRSs), which provide computerized booking capabilities to subscribing travel agencies. The primary CRSs are SABRE, Apollo, System One and WorldSpan whose majority ownership interests are held by American Airlines, United Airlines, Continental Airlines and Delta Airlines respectively. Most corporations and travel agencies receive service from only one CRS at a site and the competition amongst CRSs is intense. The CRSs publish schedule and fare data and make reservations for most major airlines, hotels and car rental agencies. They receive substantial transaction fees from participating vendors based on the number of itinerary segments booked.

The U.S. Department of Transportation (DOT) at one time allowed the CRSs to prohibit independent computer system access to the data in the CRSs. Effective Dec. 6, 1992 the DOT rescinded the restricting regulations and adopted regulations that require the CRSs to permit third parties access, subject to the establishment of certification criteria for third parties to gain.

The existing CRSs are based on 20 to 25 year old technology. When CRS systems were designated, the primary concern was keeping the processing simple so that an enormous number of reservations could be handled. To assure speed and capability, unique data streams (6 bit) and a very strict end-user command language with a limited character set was adopted that is complex and requires a trained agent to enter data or interpret responses. To assure that computer power is available for transaction processing, the CRS interfaces to the end-user are slow and permit only one user function at a time. For example, an average CRS allows retrieval of only several lines of a passenger name record (PRN) at a time and has about a one to two second response time for each block of twelve lines. Then the user has to key in a request for the next twelve lines, and so on. Since business travel passenger records can exceed 200 lines, PRN retrieval can take a substantial amount of time. When an individual traveler books a flight, hotel or car rental, all the information about the reservation is stored in centrally in the CRS. The data is purged following the travel. Since the prior DOT rule allowed the CRS to restrict system access, travel agencies and corporations did not create software interfaces with the CRSs that would allow them to capture information regarding reservations and travelers. Each CRS also held subscriber travel agencies captive by providing pre-configured computer equipment to the agency as an incentive for selecting that CRS. Most CRS equipment existing in 1993 consisted of a dumb terminal, which allowed the agent only to book travel on the CRS but did not provide storage or for manipulation to the data. A travel agency that wished to provide travel reports or access to live travel data was forced to gather such data from accounting system sources that delayed the delivery of reports and could not provide pre-trip cost information effectively. Travel agencies operate on small margins so they historically have not made a significant investment in computerization that would allow them to maintain sophisticated data systems for their corporate customers or to process information provided by the CRS. In the last two years, some agencies have developed scripting that automates some of the reservation process, usually formatting simple CRS command language from a menu.

Large corporations frequently have corporate travel departments. In addition, corporations typically enter into some form of negotiated arrangement with one or more national or regional travel agencies to manage their travel. Some corporations use an "on-site" travel agency located on the corporation's premises, which may be managed by a national or regional travel agency. In other cases, large corporations may negotiate for dedicated agents familiar with the corporation's travel policies located at national or regional reservations centers to provide booking services and 24 hour phone access for travelers. Typically, the corporation negotiates a one to three year contract with the travel agency, which defines the service to be provided, the compensation to be received by the agency, and the way that service levels will be measured and maintained. Some large corporations have actually created travel agencies that book all the corporate travel and also offer their services to the public to make profit from excess capacity.

When a corporation has an on site agency, the travel agency typically provides the personnel and computer equipment necessary to make bookings. Conventional travel agency equipment, being relatively "dumb," is not capable of interfacing with sophisticated internal computer systems that many large corporations now have that include electronic mail (E-mail), integrated local and wide area network services, accounting and data management.

Generally, the travel industry has not kept pace with the networking and communication advances of the past decade, perhaps because the industry is tied to the old airline computer systems that when they originated, pushed the state of the art, but now are antiquated and lack the user friendliness that computer users have come to expect. The fact remains that most travel arrangements are made over the phone with an agent who must slowly and laboriously use a CRS terminal. Typically four to six conversations are required to secure final travel arrangements. Information about travelers' itineraries virtually disappears until post travel credit card invoices are received or expenses reports are processed. In this environment, corporations have great difficulty finding adequate means for monitoring recent travel and entertainment expense, since normally trips are approved on the basis of cost estimates. Then, as much as three months later, management receives an indication of the actual cost of the travel including any out-of-policy travel that the employee might have made. While many travel vendors have sought to offer cost savings to corporate accounts through discount arrangements and other incentives, corporations remain largely unable to control costs because they lack the means to monitor and control costs on a day-to-day basis.

The easiest ways to obtain travel cost savings are to: eliminate unnecessary trips; insure traveler compliance with a corporate travel policy that assures the lowest fares and the use of preferred vendors; and negotiate volume discounts with providers. Observant corporate managers may be able to eliminate unnecessary trips during an approval process, but typical corporate travel departments cannot achieve traveler compliance with corporate travel policy or avail the corporation of available volume discounts. This is because the travel department does not have the data systems necessary to collect and analyze travel data nor can it communicate easily and promptly with travelers and their supervisors to make sure that the travelers travel within corporate travel policy.

As for corporate travel policy compliance, many corporations adopt some form of potential cost saving travel policy. Unfortunately, insuring compliance with policy can be difficult, since the training of all employees required just to understand the policy can cost more than the potential cost savings. In most corporations, a traveler may be required to have supervisor approval of travel destinations, but the traveler typically retains discretion with respect to airline and hotel choices. The travel agent, who is not an employee of the corporation, may be misinformed about the corporation's travel policies and typically lacks the tools to enforce policy anyhow. Airlines and other travel vendors have created powerful incentives, such as frequent flyer programs, which motivate employees to make purchase decisions favoring a preferred airline, rather than corporate cost reduction. Also, the travel environment is constantly changing and corporations do not have timely detailed information necessary to evaluate the reasonableness of costs or redefine corporate travel policies.

Airlines are extremely sensitive to shifts in market share and will negotiate volume discounts and rebates based on promised volumes for certain frequently traveled routes, referred to as city pairs (a route of travel between two airports). However, it is very difficult for corporations and their travel agencies to compile up-to-date information in order to determine popular city pair segments or to prove whether volume commitments have been achieved, much less to actually direct travel to designated vendors in order to manage volume and cause shifts in market share.

Most travel agencies currently provide limited reports on travel data to their corporate clients following the end of each month or quarter, long after the business traveler has incurred the cost. Most corporations keep track of corporate-wide travel costs by receiving corporate credit card records and travel expense report forms filed by the traveler after the trip is completed. Ticketing is therefore evaluated on a post-trip basis rather than prior to the travel being booked or ticketed. Corporation have little ability to control costs of needed travel before the travel is made.

The pricing of travel services is extremely complex and rapidly changing. There may be hundreds of different fares between any two major air destinations on a given day. Thousands of price changes are recorded every day. Besides the published fares available on CRS displays, additional discounts and other premiums are available to most corporations. These can include: discounts for travel between designated cities; discounts for travel on certain dates; discounts for a total volume of purchases at a time; mail out free travel class of service upgrades; cash rebates for volume purchases over a time period; increased agency commission on volume purchases; discounts for particular business meetings or purposes; promotional free tickets; free credits for use in purchasing preferred carrier products; and cash rebates for achieving target share of purchases on a specific carrier. Without an automated system for analyzing and comparing all discount opportunities, many tickets are not issued at the lowest fare possible but rather at the lowest published fare, the only one visible on the CRS display.

Starting in 1992, attempts have been made to provide corporate travel departments with modern user friendly software that runs on sophisticated corporate computer systems that can interface with the CRSs. Multiphase software systems for reservations, data management and expense report have been in development that have as a prime objective the presentation of flight schedules to potential travelers via their desk top computer so that they require fewer calls for reservations when they are ready to book a trip. Such software then would allow the ticket agent to note such details as cost centers, ticket delivery points and traveler supervisors and to automatically forward the itinerary of the travel via E-mail to the traveler's direct supervisor including trip purpose, projected cost and corporate cost center. In early development versions of the software, the supervisor does nothing to approve a trip. To disapprove, the supervisor contacts the travel agent. Such software could provide managers with data necessary to compile monthly reports with pictorial data that compares their division's acceptance of lower fares to the company as a whole and text details of the division's spending versus a corporate bench mark. Just this simple system has the potential for large cost savings because employees soon realize that sufficient information is available to their supervisors to spotlight out-of-policy travel. An employee who is asked by a supervisor about out-of-policy travel is less inclined to repeat such travel without a suitable excuse.

The first generation travel system available from Travel-Net, Inc. had three main components. The first is software that enables a "smart" workstation to communicate directly with a computerized reservation system and function subsequently as a reservation set. The second, is the workstation display that shows data from different sources such as a CRS, corporate policies, and E-mail at different windows on the screen at the same time. It also lets an agent move information between windows and switch easily from one task to another using a mouse or other pointing device. The workstation presents CRS information in simple formats and enables agents to execute CRS functions using the mouse rather than complex keystroke sequences that are not error tolerant. An agent may choose to view CRS information in its traditional CRS format, but when it is transferred to an E-mail message, it is translated automatically into simple English. The goal of such software is to provide an enhanced working environment for the agent to speed the booking process by making relevant information from multiple different data bases immediately available.

The third component of TravelNet's software is a relational data base management system that allows programs to be written in a very flexible way to combine separate elements of data and produce meaningful information. The data base captures all elements of each reservation record at the time a booking is made and the system allows pre-trip reporting inquiry. For example, a travel agent can note how much extra expense a division will incur on a booking not made at the lowest logical airfare. The software could move the resulting report from the system into E-mail and send it to the division head's workstation, allowing the travel agent to be in an advisory pro-active role. The data includes traveler profiles and over time, can construct traveler histories so that the corporation will be able to observe individual patterns and preferences, as in the example of an employee who regularly makes a trip to a given location. Such software gives each user network access to multiple sources of information, a powerful desk top computer to manipulate them and a workstation design that lets a user easily interact with the system. As an additional feature, TravelNet software generates an automatic travel authorization request form for a prospective traveler directly from the airline PNR.

The system then routes the request to a designated manager who must approve the trip.

By managing the purpose of a trip, assuring corporate travel policy compliance, and using pre-trip vendor market share information to negotiate lower prices, a corporation can take direct control of its travel cost and not counting the time savings of employees, reduce travel costs by 20%. However, there has been a need to provide such functions along with others to further enhance corporate travel control and allow it to be run on readily available desk top computers and increasingly more economical high powered multi-tasking servers.

Other software has been available that automatically combines various trip segments and routes to provide means for determining true origin to destination travel data from segment travel data stored as segment data in a travel reservation data base system. From the complex segment information, the system disclosed in U.S. Pat. No. 5,191,523, derives certain travel information not explicitly contained within the segment data, and through reference to a separate local data base or data storage unit, determines true travel costs and time data with reference to standard units providing, for example, cost per distance unit and travel distance per time unit enabling further processing to determine effective direct costs such as fare price and indirect costs such as travel costs per unit of employee time. However, the program is just geographic in nature, using the longitude and latitude information for the origin and destination of a trip to determine the great circle distance there between and the fare basis codes to determine the most restrictive fare rule applicable to the particular trip so that the entire trip can be analyzed. As necessary, the departure and arrival times are adjusted for time zone differences as well as standard daylight time savings variations to determine the trip time. The great circle distance, the fare cost and the trip time are then subject to further calculations to determine cost per mile, cost per hour and distance per hour. Such software, since it is post-purchase or after-ticket purchase is useful in providing data as to travel history. Therefore it is useful for setting policy in accordance with past travel but is not useful in managing present travel.

SUMMARY OF THE INVENTION

The present invention is a modular software, computer system that: allows travelers to electronically access airline inventories to obtain flight schedules very quickly in an user friendly environment; enables agents to make bookings in an assisted, simplified, consistent manner, and allows employee and travel agent access to travel specific data bases that include negotiated or special contracted fares, travel policy parameters, individual and group traveler profiles, past and present travel itineraries, preferred vendors, and authorization archives. The system lets supervisors electronically authorize trips after being informed of projected air, hotel, car and other incidental costs, and grants travel managers access to all booking data so they can better manage policy compliance, meet volumes on negotiated contracts and predict the impact of travel policy and vendor changes.

The corporate employee accesses the system, via messages sent over the corporate local or wide area network or through external mail systems that are interfaced to the network backbone by a mail server module adapting such mail services to interface with the network backbone.

A system of software server processes is used to manage communication with each specific airline CRS via CRS specific servers and gateways which intelligently communicate with airline hosts to extract airline price, schedule, and passenger reservation data for use by the employee in a user friendly, windowed environment rather than the command syntax required by most airline reservation systems. This modular aspect of the software includes error tolerant logic so that electronic misunderstandings that occur between airline reservations systems and inevitable communication errors can be tolerated. Data for language and command code conversion, screen configuration, and other likely to change data are stored in separately compilable tables so that the system is quickly reconfigurable for different corporations, the addition of other travel agencies or in response to CRS changes.

DETAILED DESCRIPTION OF THE DISCLOSED EMBODIMENTS

Figure 1:
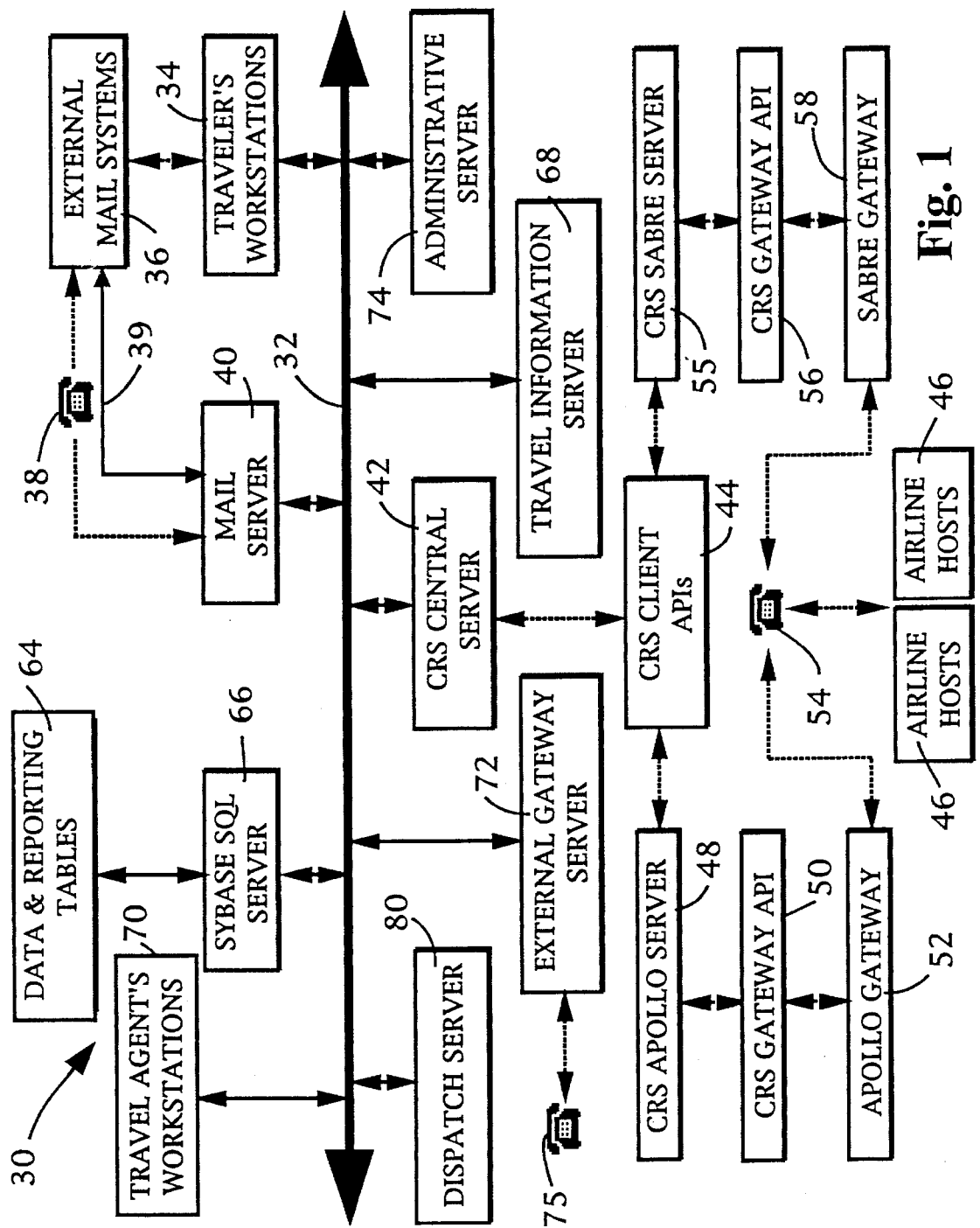
FIG. 1 is a block diagram of major physical and software components of the present invention useful in accessing airline CRSs and managing travel for corporations.

Referring to the drawings more particularly by reference numbers, number 30 in FIG. 1 refers to a complete system for controlling corporate travel constructed according to the present invention. The system 30 includes a plurality of servers connected to a data wide area network 32. The servers although shown as separate physical devices can be logical process on a single device.

In operation, a traveler uses his workstation 34 to operate travel software. The traveler's workstation 34 can be connected directly to the wide area network 32 or indirectly through exterior mail systems 36 and telephone modem line 38 or internal E-Mail network lines 39 to a mail server 40. The mail server is connected to the wide area network 32. Typical external mail systems that are commercially available include Microsoft Mail, CE QuickMail, Lotus Notes, and SMTP Mail. The mail server 40 includes some sort of commercially available modem software to complete the modem link 38 or alternatively, E-mail may be transmitted directly over the network to which the mail server is connected.

Whether the traveler's workstation 34 is connected to the wide area network 32 directly or via E-mail or networking systems, usually the first thing that traveler will do is enter a GUI screen that allows the capture of flight schedule information between city pairs during a particular time and on a date. The information is gathered by a connection through a CRS central server 42 connected to the wide area network 32, which processes the traveler's flight availability inquiry, and through a CRS client API 44, communicates with the suitable airline host 46 by means of a CRS server 48, CRS gateway API 50, and CRS gateway 52, all shown for example as connected to the Apollo CRS by means of phone line 54. In FIG. 1, as another example, a CRS SABRE server 55, SABER CRS gateway API 56 and SABER gateway 58 are also shown for use in connecting the system to the SABRE CRS.

If, for example, the Apollo CRS is to be queried by the traveler for flight information, the communication protocol of the system 30 is translated into the strict communications code required by the Apollo CRS in the Apollo server 48. Preferably the translation is done by means of a look up table provided in reprogrammable software associated with the Apollo server 48 so that it can be quickly modified any time the Apollo communication code is modified, with minimal disruption to the system 30. Upon receipt of the information requested from the Apollo CRS, the flight availability data is retranslated into the communication protocol of the system 30 and compared to preferred airline tables 64 accessible to the wide area network 32 through a Sybase SQL server 66. Use of other databases is possible. The options can then be highlighted and displayed on the traveler's workstation 34. At that point, the traveler can select a flight on the workstation 34. If a flight acceptable to the traveler is not displayed, the traveler 34 can re-enter requested flight information requesting different times or dates and thereby redo the process until an acceptable flight is determined.

At that point, the travel information server 68 creates a skeleton travel request (TR) that is displayed on the traveler's workstation 34 to which the traveler can add hotel, rental car requests and other travel information both from a menu of preferred vendors or otherwise. The availability of the skeleton TR is flashed to a plurality of agent's workstations 70 connected to the wide area network 32 either directly as shown or through networks, so that an agent can bring up the TR. The skeleton TR form is then communicated from the travel information server 68 to a travel agent's workstation 70. At the travel agent's workstation 70, the travel request can be examined for completeness. The travel agent operating the workstation 70 is able to contact the traveler electronically through the wide area network 32 and the workstation 34 or by telephone to clear up any errors or omissions of needed information.

The travel agent on the travel agent's workstation 70 then communicates through the wide area network 32, central server 42, CRS client API 44, and the selected CRS connect devices (such as Apollo CRS server 48, Apollo CRS gateway API 50 and Apollo gateway 52 to Apollo CRS) to make a reservation in accordance with the requested and agreed upon itinerary. Alternatively, a TR may be robotically stored on the airline CRS as a live PNR without any direct travel agent intervention. The itinerary is also captured from the wide area network 32 through the server 66 for storage in the tables 64 as the confirmation is received from the CRS 46. The central server 42 then communicates, to a supervisor's workstation 34, usually through the mail server 40, to receive approval while the traveler receives E-mail confirmation of the travel reservation on his workstation 34. If the immediate supervisor has indicated in his workstation 34 that he is unavailable, software can automatically forward the traveler's itinerary to the workstation 34 of the next higher level of management. If the traveler confirms back to the central server 42 that the reservation is incorrect the central server 42 causes the travel information server 68 to redisplay the travel form for reprocessing. If the reservation is correct and approved or as an option, not disapproved, the ticket agent via the travel agent's workstation 70 issues or makes arrangements to purchase the required ticket (usually as late as possible to avoid unnecessary money float) and communicates this fact to the database server 66 for later reporting. This information can also be accessed by corporate travel and expense accounting, corporate human relations and audit connected to the wide area network 32, and hotel and car rental agencies and agency accounting systems through an external gateway server 72 and a phone line 74. The cost also can be reported to the controller management by means such as the administrative server 74 so that real time travel and expense data is available.

Since published CRS data, unpublished fare data, discounts, policy and the like can be stored in the tables 64, the traveler can have access through his workstation 34 to information on the low price ticket possibilities and the option to accept or reject such ticket options when making out his itinerary request. In some instances, experienced travel agents can also book lower than published fares by routing the traveler through unusual cities or over different airlines. Since all bookings are captured, low fares constructed by the prior diligence of another rate specialist can be accessed by and shared with the travel agent, who then may offer such economical routing to the traveler. An example might be: an agent has a traveler that wishes to travel between Los Angeles and Rochester, N.Y. Noticing a very low promotional fare from Los Angeles to Baltimore, constructing a "non-published" point-to-point fare from Los Angeles to Baltimore to Rochester, the agent might determine such routing to be cheaper and not any less convenient than the published Los Angeles to N.Y. City to Rochester routing. Once one agent has stored such a fare in the database by using the software, it becomes available to other agents without duplicative extra fare and routing research.

Since all data concerning cost is captured as it is being processed along the wide area network 32, reports can be generated by the Sybase SQL server 66 that allow managers to better manage, in almost real time, travel in a corporate environment.

At the scheduled return date the travel information server 68 can be programmed to produce proforma travel expense reports and to send them via the wide area network 32 to the traveler's workstation 34. When the traveler receives the proforma travel expense report he can add items such as taxis, tips, food and actual expenditure costs on the workstation 34, which then can be forwarded electronically to an approving supervisor. If the travel expense report is not approved, it is electronically sent back to the traveler for updating. If it is approved, the travel expense report can be used to reconcile advances and receipts, ATM withdrawals, per diem and the like. The report can then be sent, via the external gateway server 72, to credit card companies, relocation systems check writing facilities and the like and the actual cost stored via the server 66 in the tables 64 so that actual total trip cost data is available as soon as it is determined, which can be used by the administrative server 74 to generate controller reports.

A dispatch server 80 is used to manage the wide area network 32 by providing event decomposition and traffic routing. The server 80 serves as the traffic cop for the system 30 to assure that the correct server operates on the data.

As aforesaid, the servers shown in FIG. 1 can be separate physical devices or logical device processes on a single computer.

Figure 2:
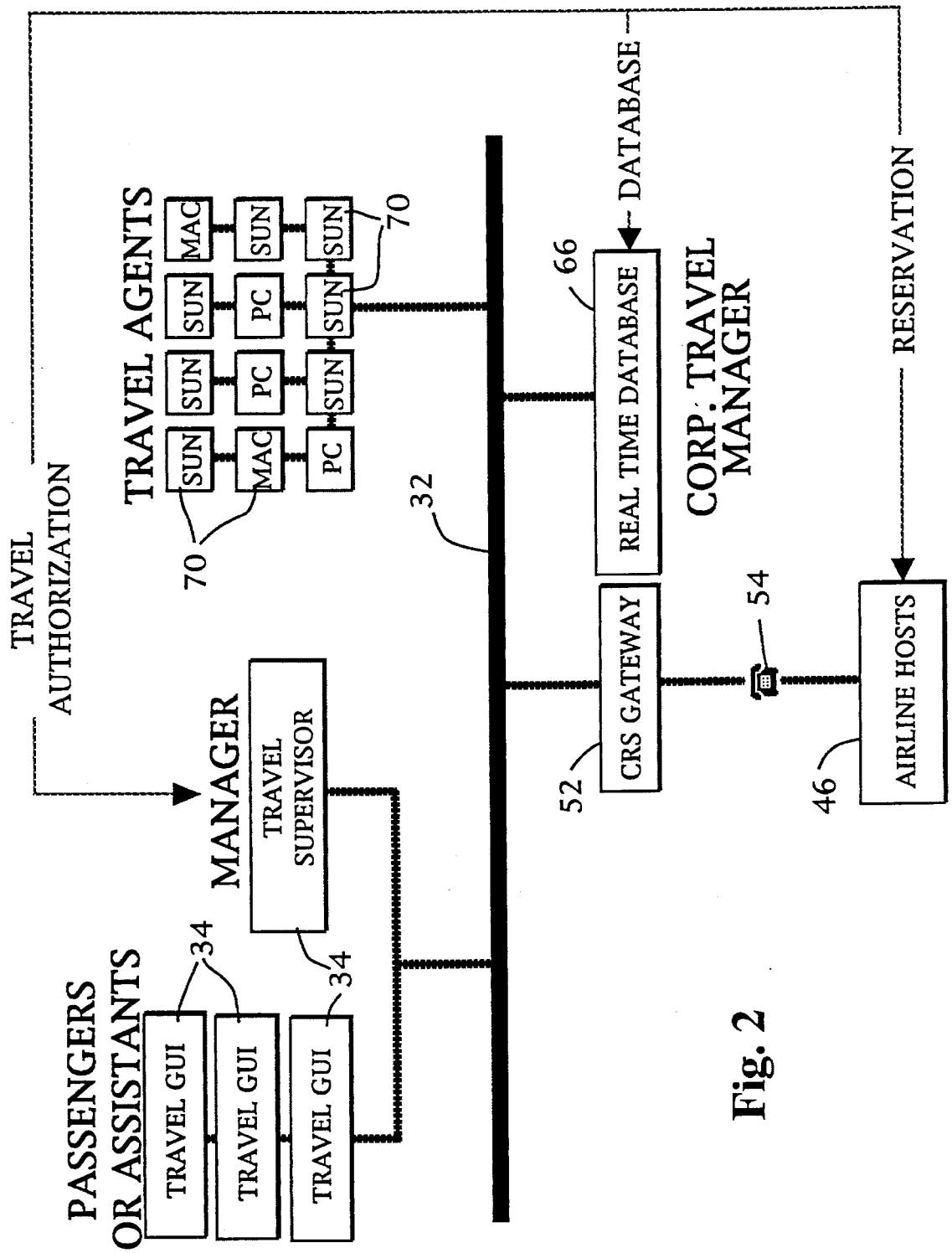
FIG. 2 is a portion of the diagram of FIG. 1 with information flow added thereto.

The information flow for a ticket purchase is shown in a more simplified manner in FIG. 2 where a corporate traveler can make reservations and purchase tickets in a completely paperless environment by first requesting flight availability information on his workstation 34, usually equipped with a user friendly graphical user interface so that no confusing codes or scripts are needed. Second, an agent receives the flight request from the passenger on the travel agent's workstation 70, which as shown can be any standard computer. When the agent ends a booking, the transaction travel authorization database record and the airline information is transparently and simultaneously updated on the database 66 as communications occurs through the CRS gateway 52 to the airline host 46.

Unfortunately, airline CRSs were designed to assure that users could not overload their functioning and therefore artificial limits are programmed therein, such as, when requesting a traveler's record, only twelve lines of the record can be requested at a time. Generally, the response time for such a request is between one and two seconds. However traveler's records can exceed two hundred lines in length. Normal practice is to acquire the first twelve lines of a record and then three seconds later start typing the request for the next twelve lines and so on so that obtaining of the complete record can take minutes.

Figure 3:
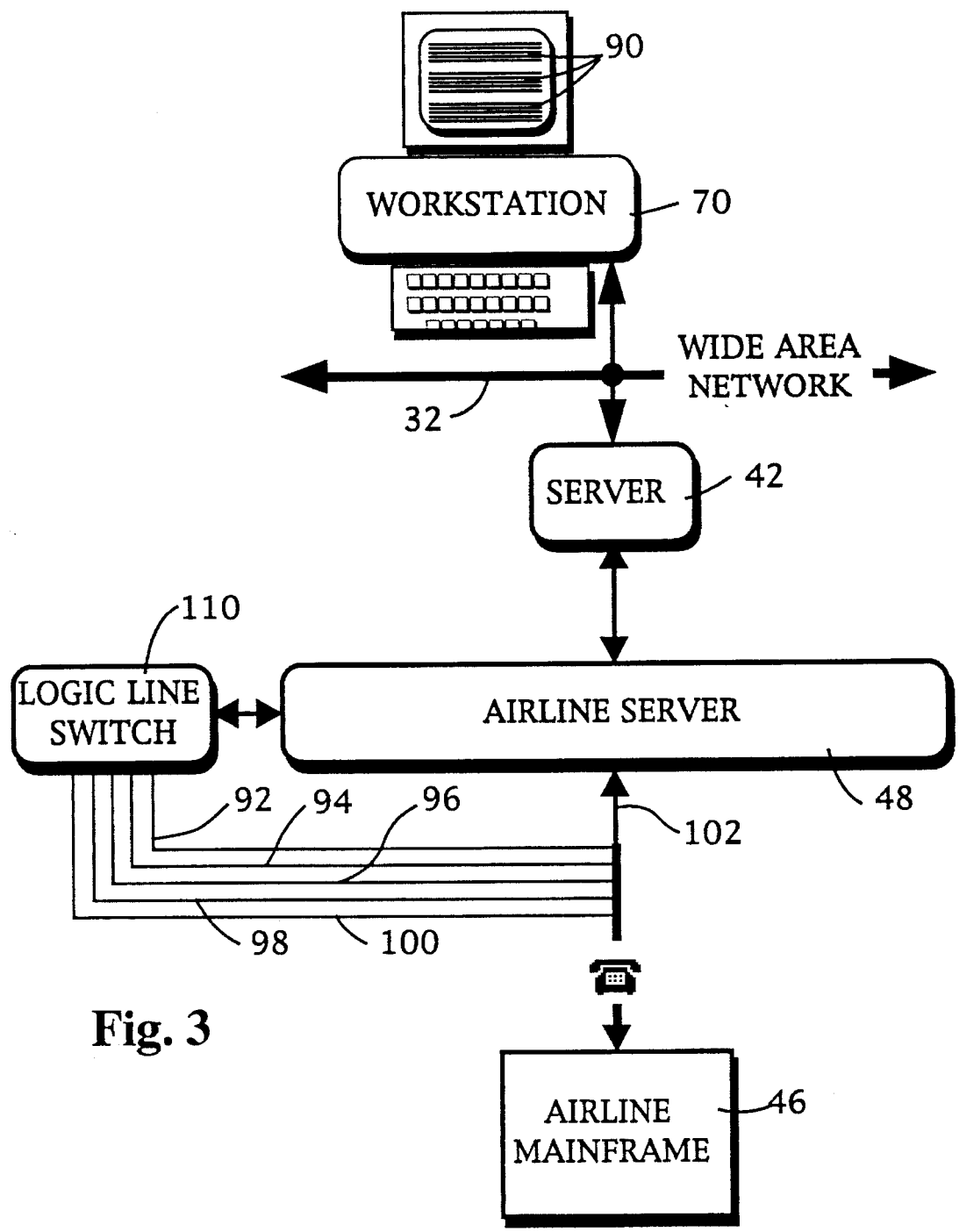
FIG. 3 is a detailed block diagram of a fast access feature of the present invention.

As shown in FIG. 3 the present system 30 overcomes this limitation by providing display 90 of an airline record almost simultaneously with its request. This is done by providing multiple addresses (logical connections 92, 94, 96 and 98 and 100) in addition to the normal address connect 102 between the airline server 48 and the airline main frame or CRS 46. As shown in FIG. 3, five dedicated logical addresses are made available to a workstation 70 through a software logic line switch 110 which senses when a passenger record is being requested from the airline CRS 46 and asks for successive portions of the record on the dedicated logical addresses 92, 94, 96, 98 and 100 simultaneously with a request on the address 102. If five dedicated addresses exist, then seventy two lines of data can be acquired in the first two seconds rather than only twelve. Software within the airline server 48 compiles the record in the proper order and supplies it to the workstation 34. If the record is not complete, the server 48 causes the next seventy two lines to be requested until the complete record has been received. The number of addresses does not need to be fixed.

Figure 4:
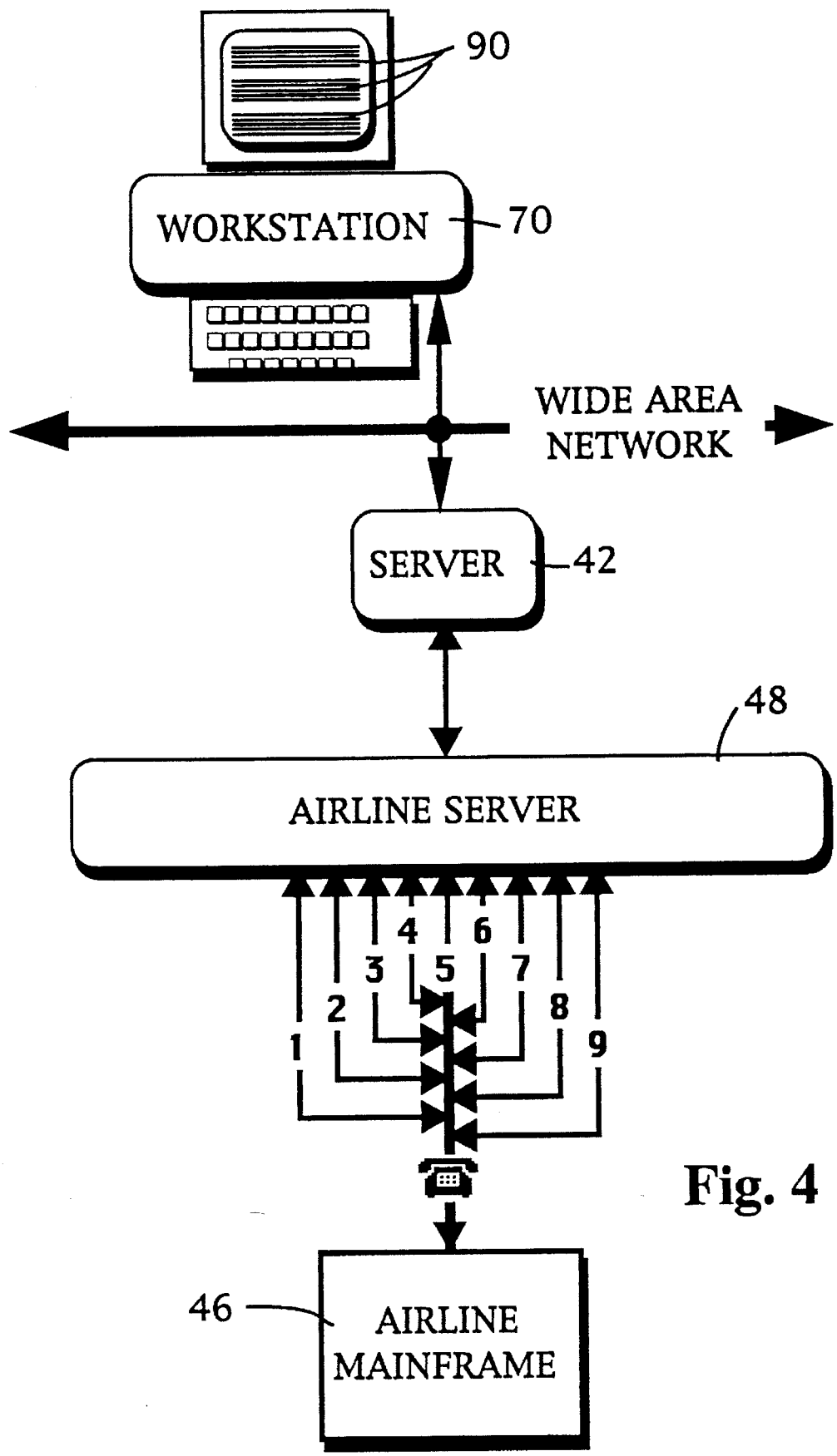
FIG. 4 is a detailed block diagram of a modified fast access feature of the present invention.

As shown in the modified embodiment of FIG. 4, extra logical addresses beyond those required for the active workstations 34 or 70 are switched on like the dedicated ones of FIG. 3, but in accordance to their availability. For example, if only 1 workstation 70 is logged in to a particular CRS 46, then 8 other addresses will be available for transferring a long record for reassembly in the airline server 48. Usually at least one address will be kept in reserve, in case another needs to log in with the CRS. Since an agent's need to download a passenger record from the CRS is a relatively rare event, for example, not more than once about every 5 minutes for a very busy travel agent, percentage wise few extra addresses are needed especially when a large office is involved. Just exactly how many is an economic trade off between travel agent time, customer satisfaction and cost since each address has a monthly fee involved therewith.

Therefore, there shown and described, novel systems for managing travel in a corporate environment or across multiple corporations or customers in a travel agent environment, which fulfill all the objects and advantages sought therefor. Many changes alterations, modifications of the uses and applications of the subject systems will become apparent to those skilled in the art after considering the specification together with the accompanying drawings. All such changes, alterations and modifications which do not depart from the spirit and scope of the invention are deemed to be covered by the invention which is limited only by the claims that follow.

We claim:

1. A system to allow rapid access to at least one airline computerized reservation system (CRS) by unskilled persons, the CRS having a generally fixed maximum response size per data request, said system including:

a plurality of workstations for inputs by unskilled persons and outputs thereto;

server means connected to said workstations;

means to translate inputs from said workstations into CRS communication code;

means to translate communication code from the CRS into outputs to said workstations;

communication means for connecting said server means to the CRS including:

a plurality of logical connections;

sensing means to sense a data request from a said workstation for CRS information that is likely to be larger than the maximum response size and produce a first signal indicative that such a data request has been received;

means responsive to said first signal to increase the number of said logical connections providing outputs to said workstation;

means to request the CRS information across said increased number of said logical connections so that the CRS responds to each logical connection with a different portion of the requested CRS information; and means to reassemble the different portions of the CRS information into the requested output for said workstation, thereby increasing the response time of said system to the data request.

2. The system as defined in claim 1 wherein said means responsive to said first signal to increase the number of said logical connections providing outputs to said workstation include:

means for dedicating a number of said logical connections for use when a workstation requests CRS information that is likely to be larger than the maximum response size.

3. The system as defined in claim 1 wherein said means responsive to said first signal to increase the number of said logical connections providing outputs to said workstation include:

means for determining the number of logical connections that are not in use, said means responsive to said first signal to increase the number of said logical connections including:

means for using a number of said logical connections available for use to fulfill a workstation request to the CRS for CRS information that is likely to be larger than the maximum response size, the number used being variable with the number of said logical connections available for use.

4. The system as defined in claim 3 wherein said means responsive to said first signal to increase the number of said logical connections providing outputs to said workstation include:

means for determining the number of logical connections that are used by said means responsive to said first signal to increase the number of said logical connections.

5. The system as defined in claim 1 further including:

at least one travel agent interface connected to said server means for communication of travel requests from said workstations, and wherein said server means further include:

storage means to capture airline itineraries verified at said travel agent interface and the costs thereof; and retrieval means to provide published fare information and prior verified itineraries fares information to said workstations so that alternate fares for an itinerary can be displayed thereby.

6. The system as defined in claim 5 wherein said storage means also stores negotiated fares, discounts, unpublished fares, free upgrades available, and system policy to display system preferred trips to said workstations.

7. The system as defined in claim 5 wherein said storage means also stores negotiated fares, discounts, unpublished fares, free upgrades available, and system policy, and further includes:

means to display data on travelers choices of travel in response to display of costs thereto.

8. The system as defined in claim 1 wherein said means to translate inputs from said workstations into CRS communication code and said means to translate CRS communication code from the CRS into outputs to said workstations include:

at least one software lookup table that is configurable for rapid response to changes in native CRS communication code without undue disturbance to said system.

9. The system as defined in claim 1 further including:

second communication means for connecting said server means to a second CRS including:
 a plurality of logical connections to the second CRS;
 sensing means to sense a request from a said workstation for second CRS information that is likely to be larger than a maximum response size and produce a second signal;
 means responsive to said second signal to increase the number of said logical connections providing outputs to said workstation;
 means to request the second CRS information across said increased number of said logical connections so that the second CRS responds to each logical connection with a different portion of the second CRS information; and
 means to reassemble the different portions of second CRS information into the requested output for said workstation, thereby increasing the response time of said system to the request of the second CRS.

10. The system as defined in claim 1 wherein said server means include:

a CRS central server that upon being requested, establishes connections with particular CRSs that are requested.

11. The system as defined in claim 10 wherein said CRS central server includes:

CRS specific servers that include:
 means to translate between system language and CRS language for the specific CRS.

12. The system as defined in claim 1 wherein said means to translate inputs from said workstations into CRS communication code and said means to translate CRS communication code from the CRS into outputs to said workstations include:

a software lookup table that is a separately compilable module, whereby said software loading table can be modified for changes in CRS communication code without undue disturbance to said system.

13. The system as defined in claim 1 further including:

at least one supervisor workstation including:
 means to display data on choices of travel in response to display of costs thereto;
 means to request approval of trips; and
 means to approve trips.

14. The system as defined in claim 1 wherein said storage means also stores negotiated fares, available discounts, available unpublished fares, available upgrades, travel policy applicable to traveler, and the actual fares of ticketed trips as they are ticketed; and means to display lowest cost within policy trip itineraries to said workstations in accordance with the information stored in said storage means.

15. The system as defined in claim 1 wherein said storage means also stores negotiated fares, discounts, unpublished fares, free upgrades available, and system policy, and further includes:

means to display data on travelers' choices of travel in response to display of costs thereto.

16. The system as defined in claim 1 wherein said means to request the CRS information across said increased number of said logical connections so that the CRS responds to each logical connection with a different portion of the requested CRS information requests the CRS information so that at least one of the different portions is the maximum response size.

17. A system to allow rapid access to at least one airline computerized reservation system (CRS) by unskilled persons, the CRS having a generally fixed maximum response size per data request, said system including:

a plurality of workstations for inputs by unskilled persons and outputs thereto;

at least one travel agent interface connected to said server means for communication of travel requests from said workstations to the at least one CRS;

server means connected to said workstations and said ticket agent interface;

means to translate inputs from said workstations into CRS communication code;

means to translate communication code from the CRS into outputs to said workstations;

communication means for connecting said server means to the CRS including:
 a plurality of logical connections;
 sensing means to sense a data request from a said travel agent interface for CRS information that is likely to be larger than the maximum response size and to produce a first signal;
 means responsive to said first signal to increase the number of said logical connections providing outputs to said travel agent interface;
 means to request the CRS information across said increased number of said logical connections so that the CRS responds to each logical connection with a different portion of the CRS information; and
 means to reassemble the different portions of the CRS information into the requested output for said travel agent interface, thereby increasing the response time of said system to the data request.

18. The system as defined in claim 17 wherein said means responsive to said first signal to increase the number of said logical connections providing outputs to said travel agent interface include:

means for dedicating a number of said logical connections for use when a travel agent interface requests CRS information that is likely to be larger than the maximum response size.

19. The system as defined in claim 17 wherein said means responsive to said first signal to increase the number of said logical connections providing outputs to said travel agent interface include:

means for determining the number of logical connections that are not in use, said means responsive to said first signal to increase the number of said logical connections including:

means for using a number of said logical connections available for use to fulfill a travel agent interface request to the CRS for CRS information that is likely to be larger than the maximum response size, the number used being variable with the number of said logical connections available for use.

20. The system as defined in claim 19 wherein said means responsive to said first signal to increase the number of said logical connections providing outputs to said travel agent interface include:

means for determining the number of logical connections that are used by said means responsive to said first signal to increase the number of said logical connections.

21. The system as defined in claim 17 wherein said server means further include:

storage means to capture airline itineraries verified at said travel agent interface and the costs thereof; and retrieval means to provide published fare information and prior verified itineraries fares information to said workstations so that alternate fares for an itinerary can be displayed thereby.

22. The system as defined in claim 21 wherein said storage means also stores negotiated fares, discounts, unpublished fares, free upgrades available, and system policy to display system preferred trips to said workstations.

23. The system as defined in claim 17 wherein said storage means also stores negotiated fares, available discounts, available unpublished fares, available upgrades, travel policy applicable, and the actual fares of ticketed trips as they are ticketed; and means to display lowest cost within policy trip itineraries to said workstations in accordance with the information stored in said storage means.

24. The system as defined in claim 17 further including:

second communication means for connecting said server means to a second CRS including:
 a plurality of logical connections to the second CRS;
 sensing means to sense a request from a said travel agent interface for second CRS information that is likely to be larger than a maximum response size and produce a second signal;
 means responsive to said second signal to increase the number of said logical connections to the second CRS providing outputs to said travel agent interface;
 means to request the second CRS information across said increased number of said logical connections to the second CRS so that the second CRS responds to each logical connection with a different portion of the the second CRS information; and
 means to reassemble the different portions of the second CRS information into the requested output for said travel agent interface, thereby increasing the response time of said system to the request of the second CRS.

25. The system as defined in claim 17 wherein said means to request the CRS information across said increased number of said logical connections so that the CRS responds to each logical connection with a different portion of the requested CRS information requests the CRS information so that at least one of the different portions is the maximum response size.

26. A system to allow rapid access to at least one airline computerized reservation system (CR8) by unskilled persons, the CRS having a generally fixed maximum response size per data request, said system including:

a plurality of traveler workstations for inputs by unskilled persons and outputs thereto;

at least one travel agent workstation connected to said server means for communication of travel requests from said traveler workstations;

server means connected to said workstations;

means to translate inputs from said workstations into CRS communication code;

means to translate communication code from the CRS into outputs to said workstations;

communication means for connecting said server means to the CRS including:
 a plurality of logical connections, the number of which is larger than the number of said travel agent workstations communicating with the CRS;
 sensing means to sense a data request from a said travel agent workstation for CRS information that is likely to be larger than the maximum response size and produce a first signal indicative that such a data request has been received;
 means responsive to said first signal to increase the number of said logical connections providing outputs to said travel agent workstation;
 means to request the CRS information across said increased number of said logical connections so that the ORS responds to each logical connection with a different portion of the requested CRS information, at least one of the different portions being the maximum response size; and
 means to reassemble the different portions of the CRS information into the requested output for said travel agent workstation, thereby increasing the response time of said system to the data request.

27. The system as defined in claim 26 further including:

second communication means for connecting said server means to a second CRS including:
 a plurality of logical connections, the number of which is larger than the number of said travel agent workstations communicating with the second CRS;
 sensing means to sense a request from a said travel agent workstation for second CRS information that is likely to be larger than a maximum response size and produce a second signal;
 means responsive to said second signal to increase the number of said logical connections providing outputs to said travel agent workstation;
 means to request the second CRS information across said increased number of said logical connections so that the second CRS responds to each logical connection with a different portion of the requested second CRS information, at least one of the different portions being the maximum response size for second CRS information; and
 means to reassemble the different portions of second CRS information into the requested output for said travel agent workstation, thereby increasing the response time of said system to the request of the second CRS.

* * * * *